US011276410B2

(12) United States Patent
Zhao et al.

(10) Patent No.: US 11,276,410 B2
(45) Date of Patent: Mar. 15, 2022

(54) CONVOLUTIONAL NEURAL NETWORK WITH PHONETIC ATTENTION FOR SPEAKER VERIFICATION

(71) Applicant: Microsoft Technology Licensing, LLC, Redmond, WA (US)

(72) Inventors: Yong Zhao, Redmond, WA (US); Tianyan Zhou, Bellevue, WA (US); Jinyu Li, Redmond, WA (US); Yifan Gong, Sammamish, WA (US); Jian Wu, Bellevue, WA (US); Zhuo Chen, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 299 days.

(21) Appl. No.: 16/682,921

(22) Filed: Nov. 13, 2019

(65) Prior Publication Data
US 2021/0082438 A1 Mar. 18, 2021

Related U.S. Application Data

(60) Provisional application No. 62/899,954, filed on Sep. 13, 2019, provisional application No. 62/900,128, filed on Sep. 13, 2019.

(51) Int. Cl.
G10L 17/14 (2013.01)
G10L 17/18 (2013.01)
(Continued)

(52) U.S. Cl.
CPC ............ G10L 17/18 (2013.01); G06N 3/08 (2013.01); G10L 17/02 (2013.01); G10L 17/14 (2013.01)

(58) Field of Classification Search
CPC ...................................................... G10L 17/14
See application file for complete search history.

(56) References Cited

U.S. PATENT DOCUMENTS

2014/0195236 A1* 7/2014 Hosom .................. G06N 3/082
704/249

OTHER PUBLICATIONS

Dey, et al., "DNN Based Speaker Embedding Using Content Information for Text-Dependent Speaker Verification," ICASSP 2018. (Year: 2018).*

(Continued)

Primary Examiner — Feng-Tzer Tzeng
(74) Attorney, Agent, or Firm — Buckley, Maschoff & Talwalkar LLC

(57) ABSTRACT

Embodiments may include reception of a plurality of speech frames, determination of a multi-dimensional acoustic feature associated with each of the plurality of speech frames, determination of a plurality of multi-dimensional phonetic features, each of the plurality of multi-dimensional phonetic features determined based on a respective one of the plurality of speech frames, generation of a plurality of two-dimensional feature maps based on the phonetic features, input of the feature maps and the plurality of acoustic features to a convolutional neural network, the convolutional neural network to generate a plurality of speaker embeddings based on the plurality of feature maps and the plurality of acoustic features, aggregation of the plurality of speaker embeddings into a first speaker embedding based on respective weights determined for each of the plurality of speaker embeddings, and determination of a speaker associated with the plurality of speech frames based on the first speaker embedding.

20 Claims, 12 Drawing Sheets

(51) Int. Cl.
*G06N 3/08* (2006.01)
*G10L 17/02* (2013.01)

(56) References Cited

OTHER PUBLICATIONS

Liu, et al. "Introducing phonetic information to speaker embedding for speaker verification," EURASIP 2019. (Year: 2019).*
Q. Jin, et al., "Is Voice Transformation a Threat to Speaker Identification?" ICASSP 2008. (Year: 2008).*
Li, et al., "Deep Factorization for Speech Signal," ICASSP 2018. (Year: 2018).*
Dey, et al., "DNN Based Speaker Embedding Using Content Information for Text-Dependent Speaker Verification", In Proceedings of IEEE International Conference on Acoustics, Speech and Signal Processing (ICASSP), Apr. 15, 2018, pp. 5344-5348.
India, et al., "Self Multi-Head Attention for Speaker Recognition", In Repository of arXiv:1906.09890v2, Jul. 1, 2019, 5 Pages.
"International Search Report & Written Opinion issued in PCT Application No. PCT/US2020/037371", dated Sep. 29, 2020, 26 Pages.
Bahdanau, Dzmitry et al., "Neural Machine Translation by Jointly Learning to Align and Translate", In repository of arXiv, arXiv:1409.0473, Sep. 1, 2014, 15 Pages.
Cai, Weicheng et al., "Exploring the Encoding Layer and Loss Function in End-to-End Speaker and Language Recognition System", In Journal of the Computing Research Repository, Apr. 2018, 8 Pages.
Chowdhury, F A Rezaur Rahman et al., "Attention-Based Models for Text-Dependent Speaker Verification", In Proceedings of IEEE International Conference on Acoustics, Speech and Signal Processing, Apr. 15, 2018, (pp. 5359-5363, 5 total pages).
Chung, Joon Son et al., "VoxCeleb2: Deep Speaker Recognition", In Proceedings of 19th Annual Conference of the International Speech Communication Association, Sep. 2, 2018, (pp. 1086-1090, 5 total pages).
Dehak, Najim et al., "Front-End Factor Analysis for Speaker Verification", Published in Journal of IEEE Transactions on Audio, Speech, and Language Processing, vol. 19, Issue 4, May 2011, DOI: 10.1109/TASL.2010.2064307, (pp. 788-798, 11 total pages).
Hadsell, Raia et al., "Dimensionality Reduction by Learning an Invariant Mapping", In Proceedings of IEEE Computer Society Conference on Computer Vision and Pattern Recognition, Jun. 17, 2006, 8 Pages.
Hajibabaei, Mahdi et al., "Unified Hypersphere Embedding for Speaker Recognition", In repository of arXiv, arXiv:1807.08312, Jul. 22, 2018, 7 Pages.
He, Kaiming et al., "Deep Residual Learning for Image Recognition", In Proceedings of the IEEE Conference on Computer Vision and Pattern Recognition, Jun. 27, 2016, (pp. 770-778, 9 total pages).
Heigold, Georg et al., "End-to-End Text-Dependent Speaker Verification", In Proceedings of IEEE International Conference on Acoustics, Speech and Signal Processing, Mar. 20, 2016, (pp. 5115-5119, 5 total pages).
Lei, Yun et al., "A Novel Scheme for Speaker Recognition Using a Phonetically-Aware Deep Neural Network", In Proceedings of IEEE International Conference on Acoustics, Speech and Signal Processing, May 4, 2014, (pp. 1695-1699, 5 total pages).
Li, Chao et al., "Deep Speaker: an End-to-End Neural Speaker Embedding System", In Repository of arXiv, arXiv:1705.02304, May 5, 2017, 8 Pages.
Li, Jinyu et al., "Improving Layer Trajectory LSTM with Future Context Frames", In Proceedings of IEEE International Conference on Acoustics, Speech and Signal Processing, May 12, 2019, (pp. 6550-6554, 5 total pages).
Liu, Yi et al., "Speaker Embedding Extraction with Phonetic Information", In Proceedings of the 19th Annual Conference of the International Speech Communication Association, Sep. 2, 2018, 5 Pages.
Liu, Weiyang et al., "SphereFace: Deep Hypersphere Embedding for Face Recognition", In Proceedings of IEEE Conference on Computer Vision and Pattern Recognition, Jul. 21, 2017, DOI: 10.1109/CVPR.2017.713, (pp. 6738-6746, 9 total pages).
Nagrani, Arsha et al., "VoxCeleb: a Large-scale Speaker Identification Dataset", In Proceedings of 18th Annual Conference of the International Speech Communication Association, Aug. 20, 2017, (pp. 2616-2620, 5 total pages).
Okabe, Koji et al., "Attentive Statistics Pooling for Deep Speaker Embedding", In Proceedings of the 19th Annual Conference of the International Speech Communication Association, Sep. 2, 2018, (pp. 2252-2256, 5 total pages).
Prince, Simon J.D. et al., "Probabilistic Linear Discriminant Analysis for Inferences About Identity", In Proceedings of IEEE 11th International Conference on Computer Vision, Oct. 14, 2007, 8 Pages.
Rahman, Hafizur Md et al., "Employing Phonetic Information in DNN Speaker Embeddings to Improve Speaker Recognition Performance", In Proceedings of 19th Annual Conference of the International Speech Communication Association, Sep. 2, 2018, (pp. 3593-3597, 5 total pages).
Ranjan, Rajeev et al., "L2-constrained Softmax Loss for Discriminative Face Verification", In Journal of the Computing Research Repository, Mar. 2017, 10 Pages.
Reynolds, Douglas A., "An Overview of Automatic Speaker Recognition Technology", In Proceedings of International Conference on Acoustics, Speech, and Signal Processing, May 13, 2002, (pp. IV-4072-IV-4075, 4 total pages).
Richardson, et al., "Deep Neural Network Approaches to Speaker and Language Recognition", Published in IEEE Signal Processing Letters, vol. 22, Issue 10, Oct. 2015, DOI: 10.1109/LSP.2015.2420092, (pp. 1671-1675, 5 total pages).
Garcia-Romero, Daniel et al., "Analysis of I-vector Length Normalization in Speaker Recognition Systems", In Proceedings of 12th Annual Conference of the International Speech Communication Association, Aug. 28, 2011, (pp. 249-252, 4 total pages).
Garcia-Romero, Daniel et al., "Improving Speaker Recognition Performance in the Domain Adaptation Challenge Using Deep Neural Networks", In Proceedings of IEEE Spoken Language Technology Workshop, Dec. 7, 2014, (pp. 378-383, 6 total pages).
Sak, Haşim et al., "Long Short-Term Memory Recurrent Neural Network Architectures for Large Scale Acoustic Modeling", In Proceedings of 15th Annual Conference of the International Speech Communication Association, Sep. 14, 2014, (pp. 338-342, 5 total pages).
Schroff, Florian et al., "FaceNet: A Unified Embedding for Face Recognition and Clustering", In Proceedings of the IEEE Conference on Computer Vision and Pattern Recognition, Jun. 7, 2015, (pp. 815-823, 9 total pages).
Snyder, David et al., "Deep Neural Network Embeddings for Text-Independent Speaker Verification", In Proceedings of 18th Annual Conference of the International Speech Communication Association, Aug. 20, 2017, (pp. 999-1003, 5 total pages).
Snyder, David et al., "Time Delay Deep Neural Network-based Universal Background Models for Speaker Recognition", In Proceedings of IEEE Workshop on Automatic Speech Recognition and Understanding, Dec. 13, 2015, (pp. 92-97, 6 total pages).
Snyder, David et al., "X-Vectors: Robust DNN Embeddings for Speaker Recognition", In Proceedings of IEEE International Conference on Acoustics, Speech and Signal Processing, Apr. 15, 2018, (pp. 5329-5333, 5 total pages).
Variani, Ehsan et al., "Deep Neural Networks for Small Footprint Text-Dependent Speaker Verification", In Proceedings of IEEE International Conference on Acoustics, Speech and Signal Processing, May 4, 2014, (pp. 4052-4056, 5 total pages).
Villalba, Jesús et al., "Towards Fully Bayesian Speaker Recognition: Integrating Out the Between-Speaker Covariance", In Proceedings of 12th Annual Conference of the International Speech Communication Association, Aug. 28, 2011, (pp. 505-508, 4 total pages).
Xie, Weidi et al., "Utterance-level Aggregation For Speaker Recognition in the Wild", In Journal of the Computing Research Repository, Feb. 2019, 6 Pages.

(56) References Cited

OTHER PUBLICATIONS

Xue, Jian et al., "Restructuring of Deep Neural Network Acoustic Models with Singular Value Decomposition", In Peoceedings of the 14th Annual Conference of the International Speech Communication Association, Aug. 25, 2013 (pp. 2365-2369, 5 total pages).

Zhang, Shi-Xiong et al., "End-to-End Attention Based Text-dependent Speaker Verification", In Proceedings of IEEE Spoken Language Technology Workshop, Dec. 13, 2016, (pp. 171-178, 8 total pages).

Zhou, Tianyan et al., "CNN With Phonetic Attention for Text-Independent Speaker Verification", In Proceedings of Automatic Speech Recognition and Understanding Workshop, Dec. 2019, 8 Pages.

Zhu, Yingke et al., "Self-Attentive Speaker Embeddings for Text-Independent Speaker Verification", In Proceedings of 19th Annual Conference of the International Speech Communication Association, Sep. 2, 2018, (pp. 3573-3577, 5 total pages).

\* cited by examiner

CONVOLUTIONAL NEURAL NETWORK WITH PHONETIC ATTENTION FOR SPEAKER VERIFICATION

CROSS-REFERENCE TO RELATED APPLICATIONS

The present application claims priority to U.S. Provisional Patent Application No. 62/899,954, filed Sep. 13, 2019, and to U.S. Provisional Patent Application No. 62/900,128, filed Sep. 13, 2019, the contents of which are incorporated herein by reference for all purposes.

BACKGROUND

Speaker verification systems are used to authenticate a speaker's identity. Generally, such systems may identify an unknown speaker by determining whether a pair of speech recordings was spoken by a same person. A speaker verification system is considered text-dependent if the speech recording is a fixed or prompted text phrase and is considered text-independent if the speech recording is unconstrained speech.

Recently-developed speaker verification systems utilize deep embeddings learned from a deep neural network. For example, a deep neural network is trained to classify speakers using a training set of speech recorded from a large number of training speakers. Next, speech recorded from each one of a set of enrollment speakers is input to the trained deep neural network in order to compute deep hidden features for each speaker in the enrollment set. The deep hidden features of each enrollment speaker are averaged to generate a compact deep embedding associated with that speaker.

To verify the identity of an unknown speaker, a test utterance of the unknown speaker is input to the trained deep neural network. A compact deep embedding associated with the unknown speaker is then generated as described above. A cosine distance is computed between the compact deep embedding associated with the unknown speaker and the compact deep embedding associated with each of the enrollment speakers. The distance between the compact deep embedding associated with the unknown speaker and the compact deep embedding associated with an enrollment speaker corresponds to a likelihood that the unknown speaker and the enrollment speaker are the same person.

Phonetic information has been employed to assist the generation of compact deep embeddings. In one approach, phonetic bottleneck (PBN) features are extracted from the last hidden layer of a pre-trained Acoustic Model for Speech Recognition (ASR) network. The PBN features are concatenated with raw acoustic features and input to the speaker embedding network. If the speaker embedding network is a deep neural network (DNN) or a long short-term memory (LSTM) network, the phonetic features are simply appended to the raw acoustic features prior to input to the speaker embedding network. Such an approach is not suitable if the speaker embedding network is a convolutional neural network because, in view of the local connectivity and spatial contiguity of convolutional operations, the spectral contiguous patterns in the input would not be preserved.

DETAILED DESCRIPTION

The following description is provided to enable any person in the art to make and use the described embodiments. Various modifications, however, will remain readily apparent to those of ordinary skill in the art.

According to some embodiments, phonetic information is integrated via an attention mechanism into a convolutional neural network (CNN) of a text-independent speaker verification system. Some embodiments employ implicit phonetic attention (IPA), in which phonetic features are extracted from a trained ASR and projected by a transformation network into multi-channel feature maps, which are then concatenated with raw acoustic features to generate augmented input features for the CNN. An attentive pooling layer is employed to extract speaker-discriminative information from the augmented input features based on learned attention weights and to generate a speaker-discriminative embedding.

Some embodiments employ explicit phonetic attention (EPA), in which the phonetic features are directly connected to the attentive pooling layer to generate the attention weights. In order to match the feature map length of the CNN output received by the attentive pooling layer, several layers of 1-dim convolutions are first applied to the phonetic features along the time axis.

In some embodiments, long-range contextual information is modeled for each time instance based on raw acoustic features and an attentive pooling layer is employed to extract speaker-discriminative information based on the long-range contextual information and to generate a speaker-discriminative embedding. The long-range contextual information may facilitate suppression of speech features caused by environmental variations such as noise and reverberation.

Figure 1:
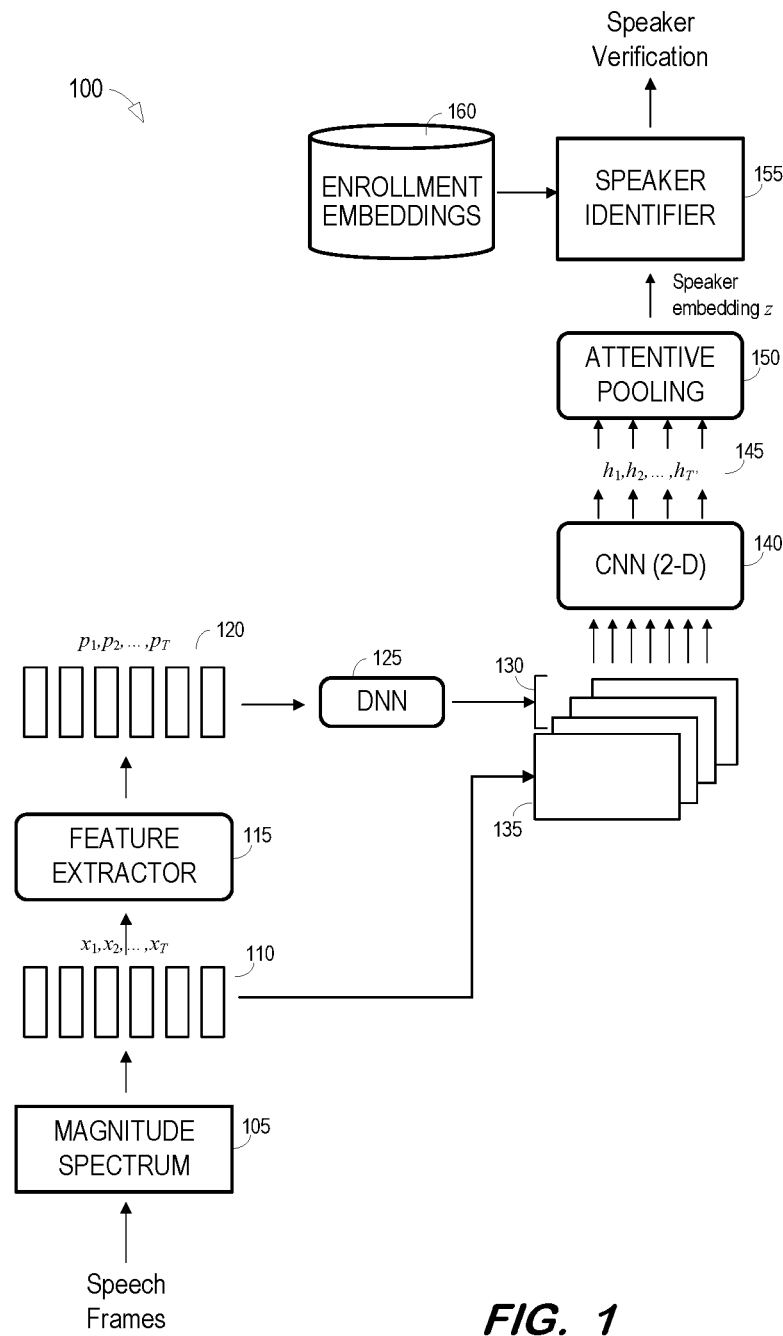
FIG. 1 is a block diagram of a system to verify a speaker's identity using phonetic features, a convolutional neural network and attentive pooling according to some embodiments.

FIG. 1 illustrates speaker verification system 100 according to some embodiments. System 100 may be used to verify a speaker's identity based on speech frames produced by the speaker. The process illustrated in FIG. 1 may be implemented using any suitable combinations of hardware and software components. Each illustrated function of FIG. 1 or otherwise described herein may be implemented by one or more computing devices (e.g., computer servers), storage devices (e.g., hard or solid-state disk drives), and other hardware as is known in the art. The components may be located remote from one another and may be elements of one or more cloud computing platforms, including but not limited to a Software-as-a-Service, a Platform-as-a-Service, and an Infrastructure-as-a-Service platform. According to some embodiments, one or more components are implemented by one or more dedicated virtual machines.

Initially, speech frames of an unknown speaker are input to magnitude spectrum unit 105 to generate frame-level magnitude spectra 110, or raw acoustic features, as is known in the art. According to some embodiments, frame-level magnitude spectra 110 are 80-dimensional log-scaled filterbank features. Magnitude spectrum unit 105 may implement any suitable signal processing to determine frame-level magnitude spectra 110 corresponding to each of the input speech frames. For example, magnitude spectrum unit 105 may implement a custom-designed Fast Fourier Transform and custom filterbank parameters.

Feature extractor 115 extracts phonetic features from each frame-level magnitude spectra 110 to generate corresponding frame-level phonetic features 120. As will be described below, feature extractor 115 may comprise a network including the input layer to the last hidden layer of a pre-trained ASR network. According to some embodiments, each frame-level phonetic feature consists of 256 dimensions.

DNN 125 transforms the frame-level phonetic features into N (e.g., N=3) feature maps 130 which are the same size as map 135 of frame-level magnitude spectra 110. According to some embodiments, DNN 125 consists of three fully-connected layers, each of which includes 256 hidden units except for a last layer including 80×N hidden units.

Maps 130 and 135 are combined into multi-channel (N+1=4 channels) frame-level features as the input of two-dimensional CNN 140. Based on this input, CNN 140 generates frame-level speaker embeddings 145. As will be described below, DNN 125 and CNN 140 are jointly trained so that phonetic features 120 are projected into feature maps 130 in the same spatial patterns as raw acoustic features 110.

CNN 140 may comprise a residual convolution neural network (ResNet)-based network. A ResNet network introduces shortcut connections between blocks of convolutional layers, which allows training deeper networks without incurring the gradient vanishing problem.

The table below describes the architecture of CNN 140 according to some embodiments. Embodiments are not limited to the architecture described below. The architecture consists of five convolutional layers without residual connection and with two residual layers inserted on top of each of the first three layers. These residual blocks do not reduce the size of the feature maps. All seventeen convolutional layers are followed by a batch normalization layer and a rectified linear units (ReLU) activation function.

| Module | Output Size |
|---|---|
| input layer | 80 × T × 1 |
| conv: (64, 3 × 3, 2) | 39 × T/2 × 64 |
| 2 × [64, 3 × 3, 1] | |
| [64, 3 × 3, 1] | |
| conv: (64, 3 × 3, 2) | 19 × T/4 × 64 |
| 2 × [64, 3 × 3, 1] | |
| [64, 3 × 3, 1] | |
| conv: (128, 3 × 3, 2) | 9 × T/8 × 128 |
| 2 × [128, 3 × 3, 1] | |
| [128, 3 × 3, 1] | |
| conv: (256, 3 × 3, 1) | 4 × T/8 × 256 |
| conv: (128, 3 × 3, 1) | 1 × T/8 × 128 |

In order to apply batch processing, input utterances are randomly cropped to 5 seconds. An utterance shorter than 5 seconds is extended by duplicating the utterance.

Attentive pooling network 150 aggregates frame-level speaker embeddings 145 into fixed-dimensional utterance-level speaker embedding z. Prior aggregation systems apply temporal average pooling to frame-level speaker embeddings in order to obtain a fixed-length speaker embedding for utterances of variable length. However, since not all frames provide information which is equally-valuable in inferring speaker identities, network 150 aggregates frame-level speaker embeddings 145 based on respective weights associated with each of frame-level speaker embeddings 145. That is, the contribution of each of frame-level speaker embeddings 145 to utterance-level speaker embedding z is based on attention weights learned by attentive pooling network 150 during training thereof.

Attentive pooling network 150 may implement shared-parameter non-linear multi-head attentive pooling, such that $U = \text{softmax}(V^T \tan h(W^T H + b))$, where the size of H is $d_h \times T'$. $d_h$ corresponds to a hidden feature dimension, and T' is proportional to input utterance length T. W, b, V are learnable parameters with sizes of $d_h \times d_a$, $d_a \times 1$, $d_a \times N$ respectively, $d_a$ corresponds to the hidden units of attentive pooling network 150 and N is the number of attention heads. U represents normalized attention weights with a size of N×T'. The final utterance-level speaker embedding may then be calculated as a weighted sum $z = UR^T$, where R represents the frame-level speaker embedding and has a size of $d_h \times T'$. z is the weighted sum of size N×d. If N=1, z is the final utterance-level speaker embedding, otherwise z is flattened and a linear projection is performed to obtain the d-dimensional utterance-level embedding z.

Speaker identifier 155 computes a similarity between speaker embedding z associated with the unknown speaker and each of enrollment embeddings 160, which comprise utterance-level speaker embeddings associated with each of several enrollment speakers. Each of enrollment embeddings 160 was previously-generated based on speech frames of a respective enrollment speaker using the same components 105, 115, 125, 140 and 150 which were used to generate speaker embedding z. Speaker identifier 155 may identify the unknown speaker as the enrollment speaker whose associated embedding is most similar to speaker embedding z associated with the unknown speaker. If none of enrollment embeddings 160 is sufficiently similar to speaker embedding z, speaker identifier 155 may output an indication that the unknown speaker cannot be identified from (i.e., is not one of) the enrollment speakers. Speaker identifier 155 may be implemented by a computing device executing an algorithm for computing similarities, by a trained neural network, etc.

Figure 2:
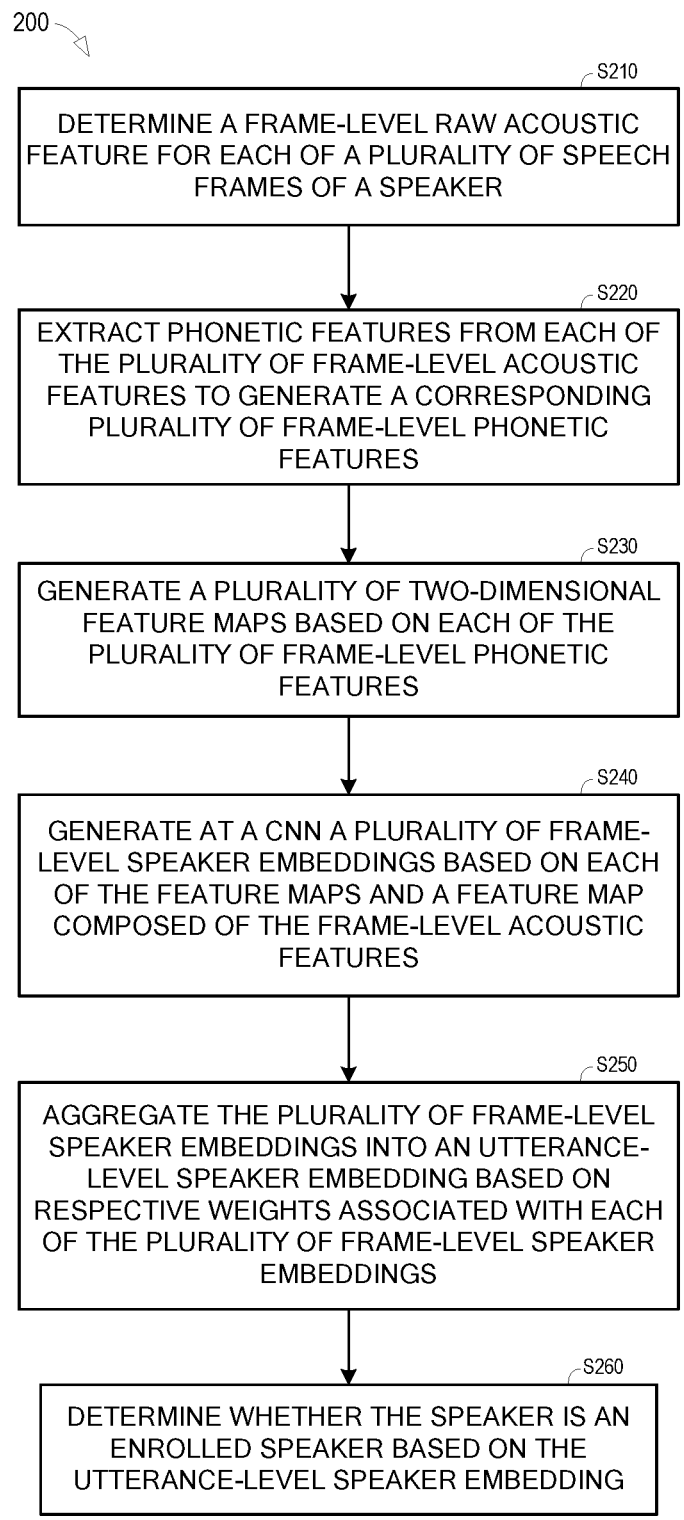
FIG. 2 is a flow diagram of a process to verify a speaker's identity using phonetic features, a convolutional neural network and attentive pooling according to some embodiments.

FIG. 2 is a flow diagram of process 200 to perform speaker verification according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Embodiments are not limited to the examples described herein.

Process 200 begins with speech signals of an unknown speaker to be verified. For each of a plurality of frames of the speech signals, a frame-level raw acoustic feature is determined at S210. The frame-level raw acoustic features may comprise log-scaled filterbank features according to some embodiments. The frame-level raw acoustic features may be determined at S210 using any known signal processing designed to extract speaker-discriminative features from speech frames. With reference to FIG. 1, magnitude spectrum unit 105 may generate frame-level magnitude spectra for each of the input speech frames according to some embodiments of S210.

Next, at S220, phonetic features are extracted from each of the plurality of frame-level acoustic features, to generate a corresponding plurality of frame-level phonetic features. As will be described in detail below, the phonetic features may be extracted by inputting the frame-level acoustic features into a pre-trained ASR network and extracting the frame-level phonetic features from a last hidden layer (e.g., a phonetic bottleneck layer) of the ASR network.

A plurality of two-dimensional feature maps are generated at S230 based on each of the plurality of frame-level phonetic features. According to some embodiments, a DNN transforms the frame-level phonetic features into N feature maps which are the same size as a map of the frame-level acoustic features. Such a transformation facilitates the input of the N+1 maps as multi-channel frame-level features which preserve the spectral contiguous patterns of the frames across the channels. A CNN generates frame-level speaker embeddings based on the input maps at S240.

At S250, the frame-level speaker embeddings are aggregated into an utterance-level speaker embedding based on respective attention weights assigned by a trained attention network. The attention network is trained such that those features which include more speaker-discriminative information are weighted more heavily in the aggregation than features which include less speaker-discriminative information. Accordingly, each frame-level speaker embedding will likely not contribute equally to the utterance-level speaker embedding.

As will be described below, the DNN, the CNN and the attention network are trained jointly for a speaker verification task in order to implement the functions described above.

At S260, it is determined whether the unknown speaker is an enrolled speaker based on the utterance-level speaker embedding. S260 may utilize enrollment embeddings which were previously-generated by executing S210 through S250 based on speech frames of known speakers. The utterance-level speaker embedding of the unknown speaker is compared against each of the enrollment embeddings (e.g., by computing cosine distances) to determine a most-similar enrollment embedding. The speaker associated with the most-similar enrollment embedding is determined to be the unknown speaker. If none of the enrollment embeddings are deemed sufficiently similar to the unknown speaker embedding (e.g., the cosine distance is greater than a threshold), it may be determined that the unknown speaker is not one of the enrolled speakers.

Figure 3:
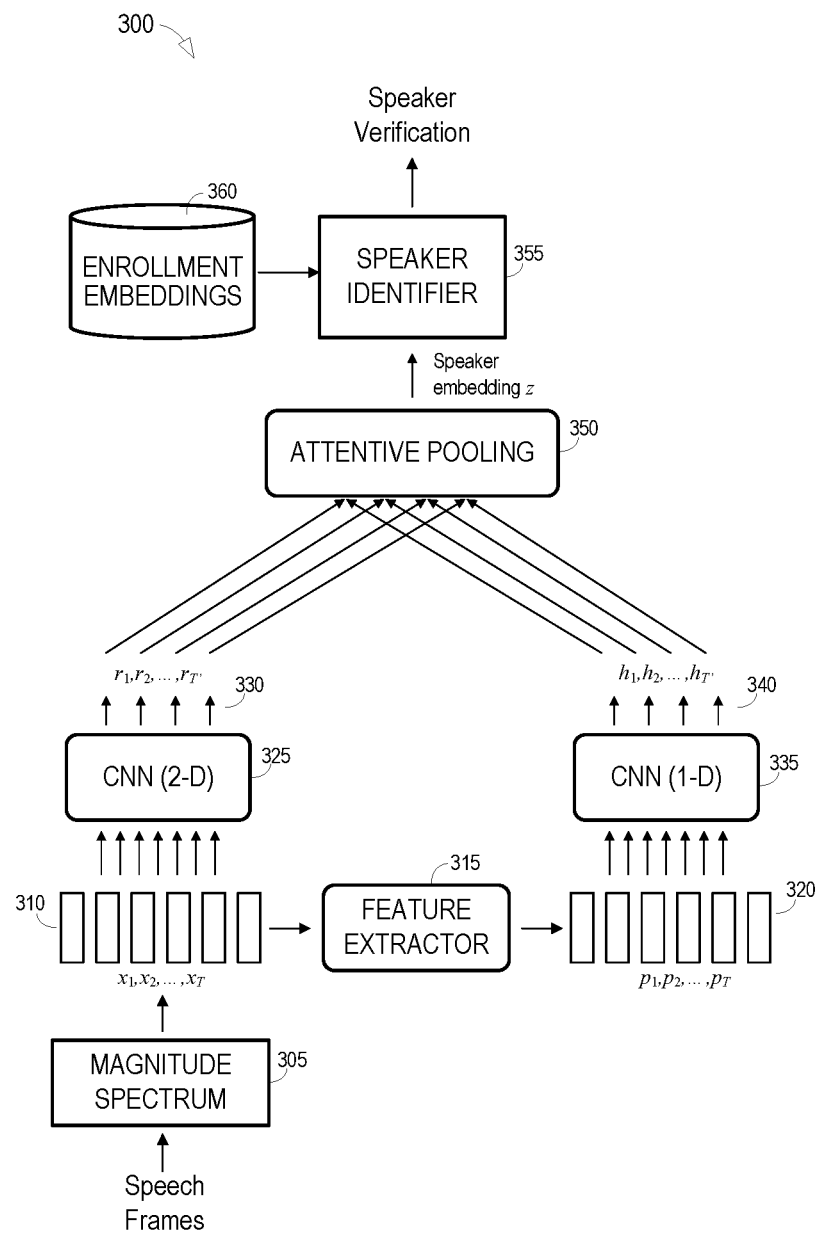
FIG. 3 is a block diagram of a system to verify a speaker's identity using phonetic features, convolutional neural networks and attentive pooling according to some embodiments.

FIG. 3 illustrates speaker verification system 300 according to some embodiments. Like system 100, system 300 may be used to verify a speaker's identity based on speech frames produced by the speaker. However, in system 300, the frame-level phonetic features are directly connected to the attentive pooling network to generate the attention weights. Frame-level raw acoustic features are again input to a two-dimensional CNN to generate frame-level speaker embeddings. In order to synchronize the frame-level phonetic features directly connected to the attentive pooling network with the frame-level speaker embeddings output by the two-dimensional CNN in the striding and pooling operations of convolutions, a one-dimensional CNN network is applied to the phonetic features, where the striding operations are synchronized with the two-dimensional CNN along the time axis.

As shown, speech frames of an unknown speaker are input to magnitude spectrum unit 305 to generate frame-level magnitude spectra 310, or raw acoustic features, as is known in the art. Frame-level magnitude spectra 310 may comprise 80-dimensional log-scaled filterbank features.

Feature extractor 315 extracts phonetic features from each frame-level magnitude spectra 310 to generate corresponding frame-level phonetic features 320. Feature extractor 315 may comprise a pre-trained ASR network and frame-level phonetic features 320 may be extracted from a last hidden layer of the pre-trained ASR network. According to some embodiments, each frame-level phonetic feature 320 consists of 256 dimensions.

Frame-level magnitude spectra 310 are input to CNN 325, which may be constructed as described above. CNN 325 generates frame-level speaker embeddings 330 based on frame-level magnitude spectra 310.

Frame-level phonetic features 320 are input to CNN 335 to generate frame-level phonetic outputs 340. CNN 335 synchronizes striding operations with CNN 325 along the time axis in order to synchronize frame-level phonetic outputs 340 with frame-level speaker embeddings 330 in the striding and pooling operations of convolutions. According to some embodiments, CNN 335 is a one-dimensional CNN consisting of five convolutional layers without intermediate residual blocks. The convolutional layers are followed by a batch normalization and ReLU activation functions.

Attentive pooling network 350 aggregates frame-level speaker embeddings 330 into fixed-dimensional utterance-level speaker embedding z based on frame-level phonetic outputs 340. For example, frame-level phonetic outputs 340 may determine the attention weights applied to various ones of frame-level speaker embeddings 330 during the aggregation. According to some embodiments, the attention weights are calculated by substituting phonetic outputs 340 for H in above equation $U=\text{softmax}(V^T \tan h(W^T H+b))$.

Speaker identifier 355 computes a similarity between speaker embedding z associated with the unknown speaker and each of enrollment embeddings 360. Each of enrollment embeddings 360 was previously-generated based on speech frames of a respective enrollment speaker using the same components 305, 315, 325, 335 and 350 which were used to generate speaker embedding z. Speaker identifier 355 may identify the unknown speaker as the enrollment speaker whose associated embedding is most similar to speaker embedding z associated with the unknown speaker. If none of enrollment embeddings 360 is sufficiently similar to speaker embedding z, speaker identifier 355 may output an indication that the unknown speaker cannot be identified from (i.e., is not one of) the enrollment speakers.

Figure 4:
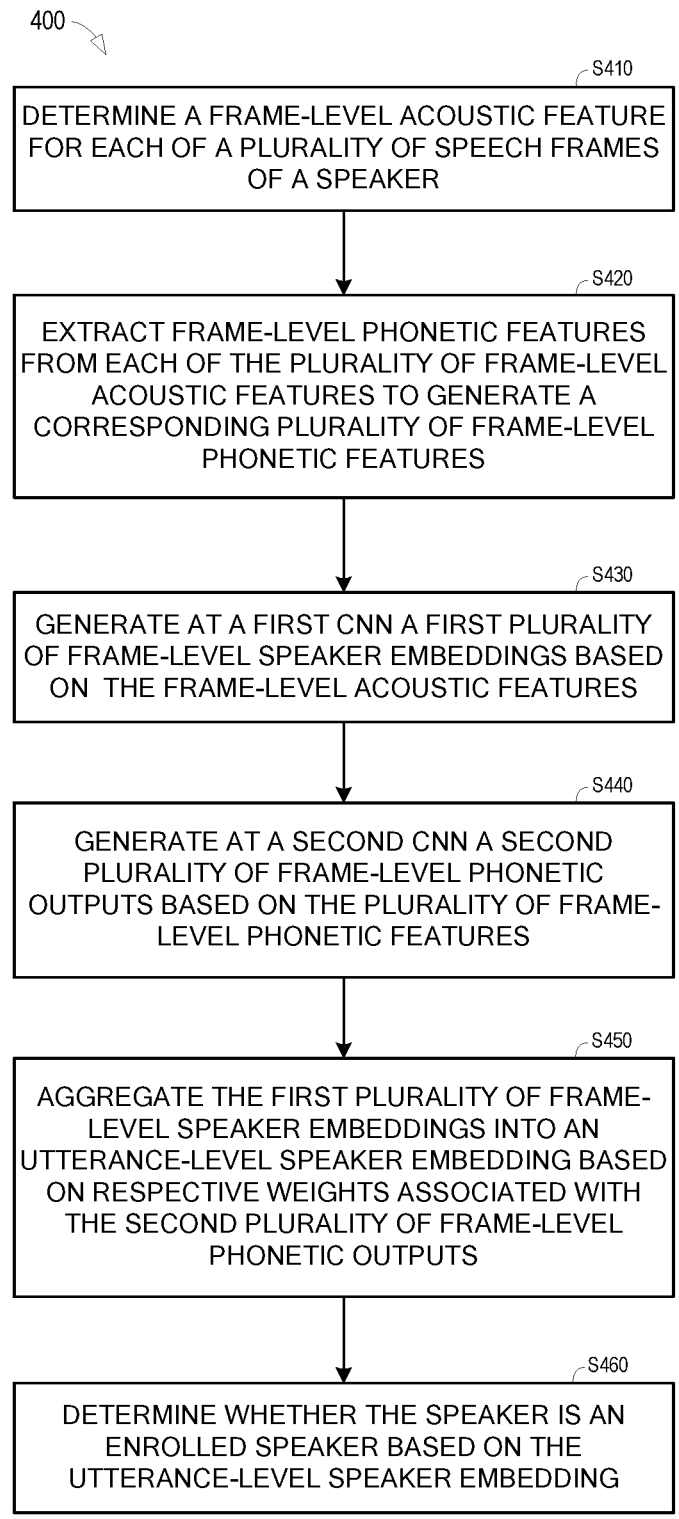
FIG. 4 is a flow diagram of a process to verify a speaker's identity using phonetic features, convolutional neural networks and attentive pooling according to some embodiments.

FIG. 4 is a flow diagram of process 400 to perform speaker verification according to some embodiments. Process 400 may be implemented by system 300 of FIG. 3, but embodiments are not limited thereto.

A frame-level raw acoustic feature is determined at S410 for each of a plurality of frames of speech signals of an unknown speaker. The frame-level raw acoustic features may be determined at S410 using any known signal processing designed to extract speaker-discriminative features from speech frames, and may comprise log-scaled filterbank features according to some embodiments. With reference to FIG. 3, magnitude spectrum unit 305 may generate frame-level magnitude spectra 310 for each of the input speech frames according to some embodiments of S410.

At S420, phonetic features are extracted from each of the plurality of frame-level acoustic features to generate a corresponding plurality of frame-level phonetic features. A first CNN generates frame-level speaker embeddings based on the frame-level acoustic features at S430. Next, at S440, a second CNN generates a second plurality of frame-level phonetic outputs based on the frame-level phonetic features. The second plurality of frame-level phonetic outputs may be generated so as to be synchronized with the frame-level speaker embeddings output by the first CNN in the striding and pooling operations of convolutions.

The frame-level speaker embeddings are aggregated into utterance-level speaker embedding z based on frame-level phonetic outputs at S450. According to some embodiments of S450, an attentive pooling network determines the weights applied to various ones of the frame-level speaker embeddings during the aggregation based on the frame-level phonetic outputs.

At S460, it is determined whether the unknown speaker is an enrolled speaker based on the utterance-level speaker embedding. The utterance-level speaker embedding of the unknown speaker may be compared against each of a plurality of enrollment embeddings to determine an enrollment embedding which is most similar to the utterance-level speaker embedding. The speaker associated with the most-similar enrollment embedding is determined to be the unknown speaker. If none of the enrollment embeddings are deemed sufficiently similar to the unknown speaker embedding, it may be determined at S460 that the unknown speaker is not one of the enrolled speakers.

Figure 5:
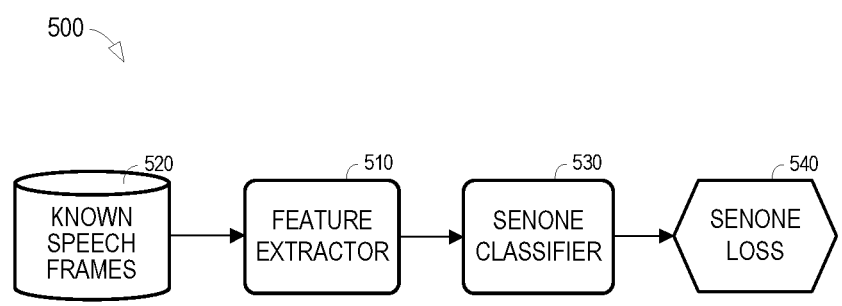
FIG. 5 is a block diagram to illustrate training of a feature extractor of an acoustic model according to some embodiments.

The above description of FIG. 1 through 4 assumes the existence of a feature extractor capable of extracting frame-level speaker-discriminative phonetic features from raw acoustic features. FIG. 5 illustrates system 500 to train such a feature extractor according to some embodiments. Embodiments are not limited to system 500.

During training, feature extractor 510 receives a training set of known speech frames 520 and maps speech frames 520 to intermediate deep hidden features. Senone classifier 530 receives the intermediate deep hidden features and maps the features to senone posteriors, which are compared against the known attributes of the speech frames to determine senone loss 540. The parameters of feature extractor 510 and senone classifier 530 are then optimized iteratively in order to minimize senone loss 540.

In some embodiments, feature extractor 510 comprises the first few layers of a background deep neural network as a feature extractor network $M_f$ with parameters $\theta_f$ that maps input speech frames $X=\{x_1, \ldots, x_T\}$, $x_T \in R^{r_x}$, $t=1, \ldots, T$ from training set 520 to intermediate deep hidden features $F=\{f_1, \ldots, f_T\}$, $f_T \in R^{r_f}$ and senone classifier 530 comprises the upper layers of the background deep neural network as a senone classification network $M_y$ with parameters $\theta_y$ that maps the deep hidden features F to senone posteriors $p(s|f_t; \theta_y)$, $s \in S$ as follows:

$$f_t = M_f(x_t)$$

$$p(s|x_t; \theta_f, \theta_y) = M_y(f_t)$$

$\theta_f$ and $\theta_y$ may be optimized by minimizing the cross-entropy loss of senone classification below:

$$L_{senone}(\theta_f, \theta_y) = -\frac{1}{T}\sum_{t=1}^{T} \log p(y_t | x_t; \theta_f, \theta_y)$$

$$= -\frac{1}{T}\sum_{t=1}^{T}\sum_{a \in A} 1[a = y_t] \log M_y(M_f(x_t))$$

where $Y=\{y_1, \ldots, y_T\}$, $y_T \in A$ is a sequence of senone labels aligned with X and 1[.] is the indicator function which equals 1 if the condition in the squared bracket is satisfied and 0 otherwise.

In one non-exhaustive example, 510 feature extractor and senone classifier 530 are implemented as an LSTM hidden Markov model (HMM) acoustic model for large vocabulary speech recognition. The input feature for every 10 ms speech frame is an 80-dimensional static log Mel filterbank feature. The output layer modeling senones includes 9404 nodes.

Some embodiments for generating a feature extractor include training of two acoustic models including different feature extractor networks. The first feature extractor network is a standard 4-layer LSTM trained with a number of hours of speech recordings. The second is a 6-layer contextual layer trajectory LSTM (cltLSTM) trained with significantly more (e.g., 10×) hours of speech recordings. All the LSTM units of both networks are 1024 memory cells and the output dimension of each layer is reduced to 512 by linear projection. Both networks are compressed using singular value decomposition (SVD) by keeping 60% of total singular values. After SVD, the linear matrix connecting the last hidden layer with the softmax layer is reduced to two low-rank matrices with size 256×512 and 9404×256, respectively. The bottleneck layer dimension is 256, and the frame-level phonetic features described herein are extracted from this bottleneck layer.

A neural network (e.g., deep learning, deep convolutional, or recurrent) according to some embodiments comprises a series of "neurons," such as LSTM nodes, arranged into a network. A neuron is an architecture used in data processing and artificial intelligence, particularly machine learning, that includes memory that may determine when to "remember" and when to "forget" values held in that memory based on the weights of inputs provided to the given neuron. Each of the neurons used herein are configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance are related to one another.

For example, an LSTM serving as a neuron includes several gates to handle input vectors, a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. Neurons and neural networks may be constructed programmatically (e.g., via software instructions) or via specialized hardware linking each neuron to form the neural network.

Figure 6:
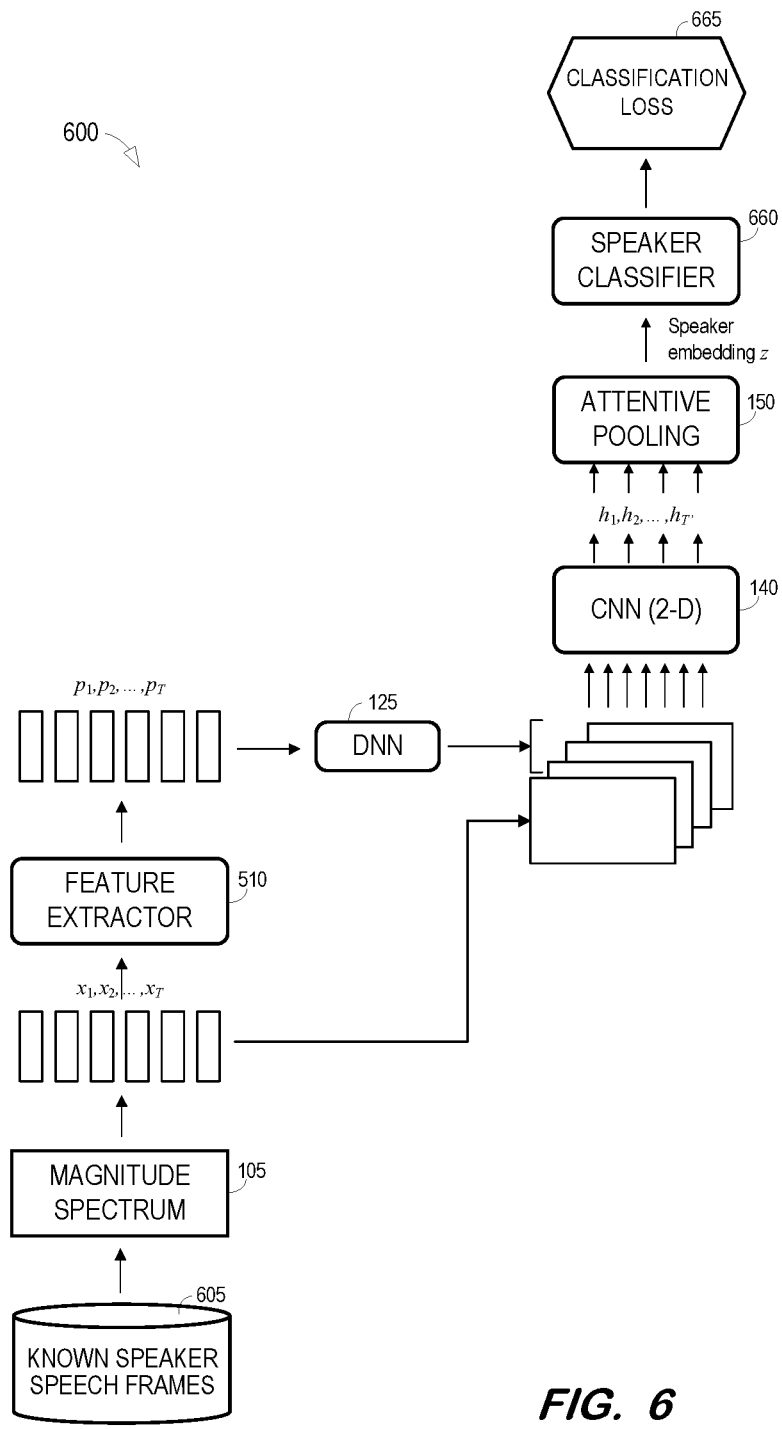
FIG. 6 is a block diagram illustrating end-to-end training of a system to verify a speaker's identity using phonetic features, a convolutional neural network and attentive pooling according to some embodiments.

FIG. 6 illustrates training architecture 600 according to some embodiments. Training architecture 600 may be used to jointly train DNN 125, CNN 140, attentive pooling network 150 and speaker classifier 660 to perform speaker classification. Speaker classifier 660 may comprise any architecture to classify speakers based on an utterance-level speaker embedding that is or becomes known. Training architecture 600 may be implemented using any suitable system to instantiate and train one or more artificial neural networks of any type. After such training, trained networks DNN 125, CNN 140 and attentive pooling network 150 may be deployed, along with pre-trained feature extractor 510, in a speaker verification network as shown in FIG. 1.

Generally, training architecture 600 operates to input speech frames 605 of known speaker data, evaluate the resulting output (e.g., speaker classification loss 665) with respect to training objectives (e.g., minimize classification loss), modify parameters of DNN 125, CNN 140, attentive pooling network 150 and speaker classifier 660 accordingly, and repeat the process until the training objectives are sufficiently met.

According to some embodiments, the training objective function is the objective of $L_2$-constrained softmax, as follows, $$L = -\frac{1}{M}\sum_{i=1}^{M} \log \frac{e^{W_{y_i}^T z_i + b_{y_i}}}{\sum_{j=1}^{C} e^{W_j^T z_i + b_j}}$$

subject to $\|z_i\|_2 = \alpha$, i=1, 2, ... M, where $z_i$ is the utterance-level speaker embedding in a mini-batch of size M with label $y_i$. C is the number of training speaker identities and $\alpha$ is the magnitude of $z_i$, which could either be static or learnable.

In some embodiments, the training objective function is the objective of A-softmax, as follows, $$L = -\frac{1}{M}\sum_{i=1}^{M} \log \frac{e^{\|z_i\|\cos(m\theta_{y_i,i})}}{e^{\|z_i\|\cos(m\theta_{y_i,i})} + \sum_{j\neq y_i} e^{\|z_i\|\cos(m\theta_{j,i})}}$$

where $\theta_{j,i}$ is the angle between vector $W_j$ and $z_i$ and m is a hyper-parameter adjusting the angular margin.

Figure 7:
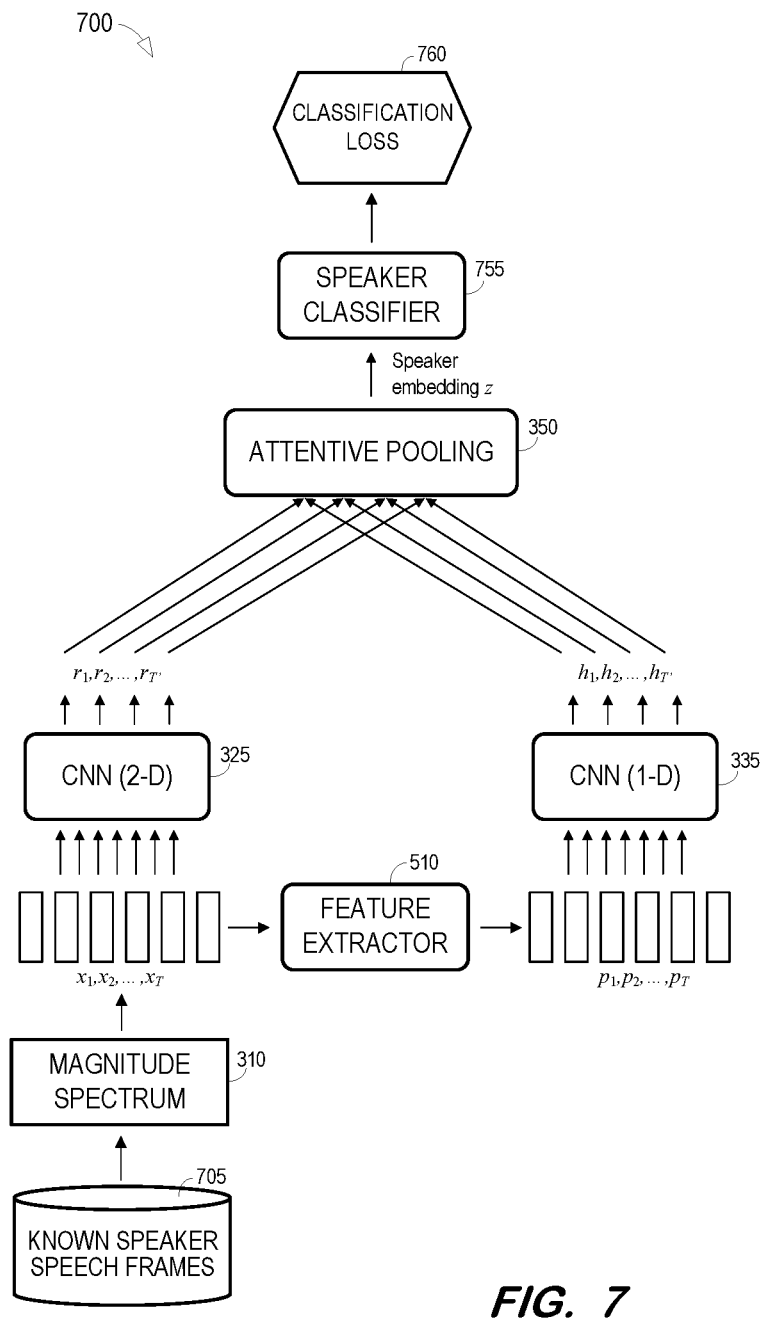
FIG. 7 is a block diagram illustrating end-to-end training of a system to verify a speaker's identity using phonetic features, convolutional neural networks and attentive pooling according to some embodiments.

FIG. 7 illustrates training architecture 700 according to some embodiments. Training architecture 700 may be used to jointly train CNN 325, CNN 335, attentive pooling network 350 and speaker classifier 755 to perform speaker classification. Speaker classifier 755 may comprise any architecture to classify speakers based on an utterance-level speaker embedding that is or becomes known. After training, trained networks CNN 325, CNN 335 and attentive pooling network 350 may be deployed, along with pre-trained feature extractor 510, in a speaker verification network as shown in FIG. 3.

Similarly to the description of training architecture 600, training architecture 700 operates to input speech frames 705 of known speaker data, evaluate the resulting output (e.g., speaker classification loss 760) with respect to training objectives (e.g., minimize classification loss), modify parameters of CNN 325, CNN 335, attentive pooling network 350 and speaker classifier 755 accordingly, and repeat the process until the training objectives are sufficiently met.

According to some embodiments, the training objective function is the objective of $L_2$-constrained softmax or of A-softmax. Embodiments may implement any other suitable objective function.

Figure 8:
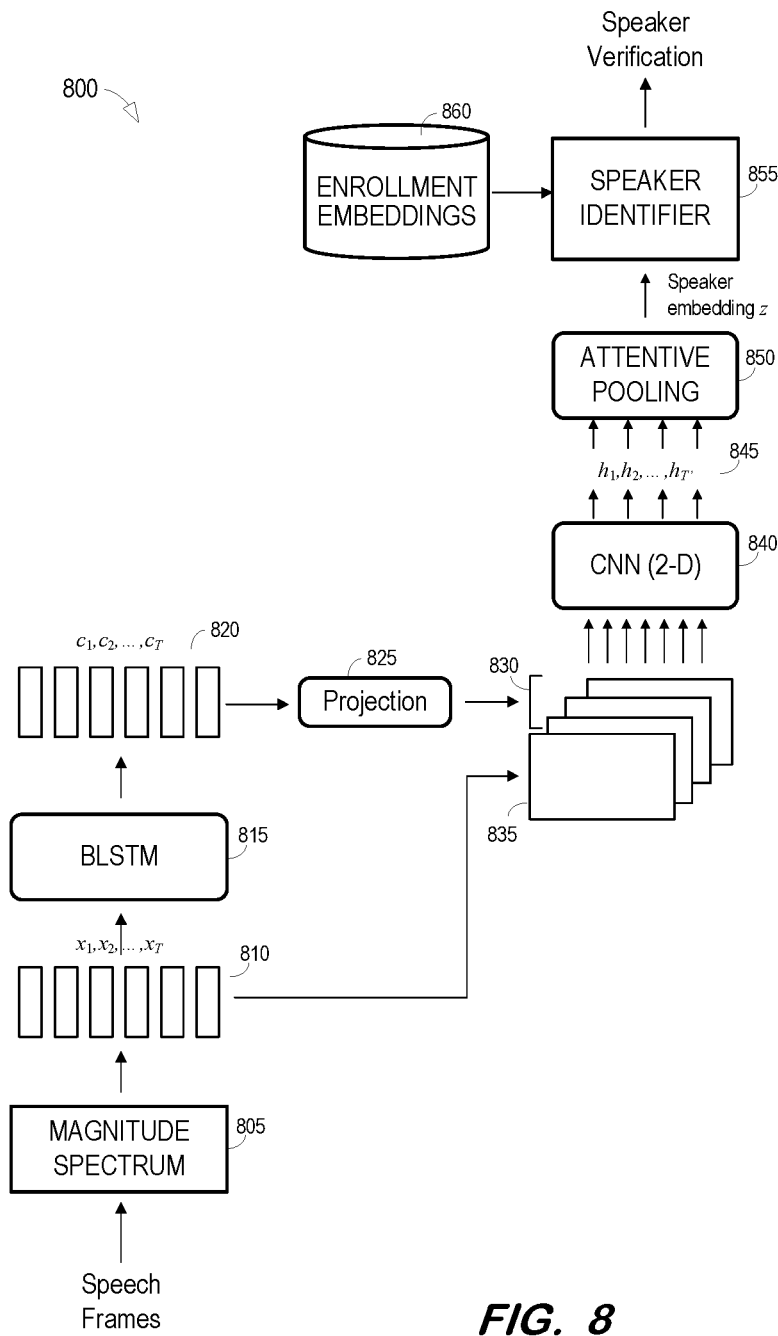
FIG. 8 is a block diagram of a system to verify a speaker's identity using long-range contextual features, a convolutional neural network and attentive pooling according to some embodiments.

FIG. 8 illustrates speaker verification system 800 according to some embodiments. System 800 may be used to verify a speaker's identity based on speech frames produced by the speaker. As will become evident from the description below, architecture 800 provides an end-to-end learning framework which forgoes a need for transcription of a training set (i.e., to pre-train an acoustic model), and in which all components are jointly optimized using a unified cross-entropy loss function.

As depicted, speech frames of an unknown speaker are input to magnitude spectrum unit 805 to generate frame-level magnitude spectra 810, or raw acoustic features. Frame-level magnitude spectra 810 may comprise 80-dimensional log-scaled filterbank features. Bi-directional LSTM (BLSTM) 815 receives frame-level magnitude spectra 810 and models long-range (i.e., long-term temporal) contextual information 820 in both directions for each time instance. According to some embodiments, BLSTM 815 consists of two BLSTM layers, with 128 LSTM cells in each of the forward and backward directions.

Projection layer 825 projects and reshapes long-range contextual information 820 into N (e.g., N=3) feature maps 830 of the same size as map 835 of raw acoustic features 810. Projection layer 825 may comprise a linear layer including 80×N output units.

Maps 830 and 835 are combined into multi-channel (N+1=4 channels) frame-level features as the input of two-dimensional CNN 840. In an alternative embodiment to that depicted in FIG. 8, only projected maps 830, and not map 835, are input to CNN 840 (i.e., raw acoustic features 810 are not directly input to CNN 840). In yet another alternative, projection layer 825 projects and reshapes long-range contextual information 820 into a single map, adds the single map to features 810, and inputs the sum to CNN 840.

The foregoing alternatives may also be applicable to a system such as system 100 of FIG. 1. More specifically, system 100 may be modified such that CNN 140 only receives projected maps 130 and does not receive map 135. Alternatively, DNN 125 may project phonetic information 120 into a single map which is added to acoustic features 110, where the resulting sum is input to CNN 140.

CNN 840 generates frame-level speaker embeddings 845 based on the input. Projection layer 825 and CNN 840 may be jointly trained so that long-range contextual information 820 is projected into feature maps 830 in the same spatial patterns as raw acoustic features 810. CNN 840 may comprise a residual convolution neural network (ResNet)-based network implemented as described above with respect to CNN 140, but embodiments are not limited thereto.

Attentive pooling network 850 aggregates frame-level speaker embeddings 845 into fixed-dimensional utterance-level speaker embedding z based on attention weights learned by attentive pooling network 850 during training thereof. Attentive pooling network 850 may implement shared-parameter non-linear multi-head attentive pooling, such as that described with respect to attentive pooling network 150, but embodiments are not limited thereto.

Speaker identifier 855 computes a similarity between speaker embedding z associated with the unknown speaker and each of enrollment embeddings 860, which comprise utterance-level speaker embeddings associated with each of several enrollment speakers. Each of enrollment embeddings 60 was previously-generated based on speech frames of a respective enrollment speaker using the same components 805, 815, 825, 840 and 850 which were used to generate speaker embedding z. Speaker identifier 855 may identify the unknown speaker as the enrollment speaker whose associated embedding is most similar to speaker embedding z associated with the unknown speaker. If none of enrollment embeddings 860 is sufficiently similar to speaker embedding z, speaker identifier 855 may output an indication that the unknown speaker cannot be identified from (i.e., is not one of) the enrollment speakers.

Figure 9:
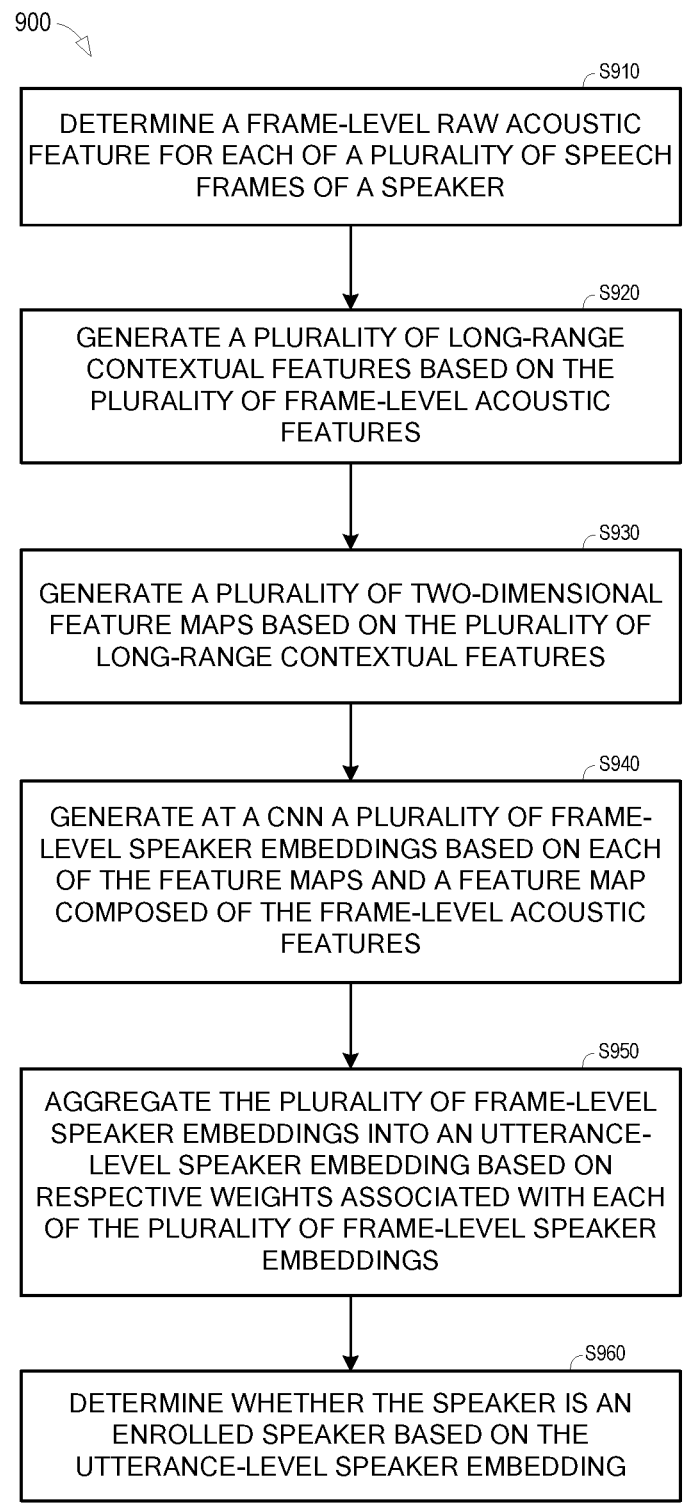
FIG. 9 is a flow diagram of a process to verify a speaker's identity using long-range contextual features, a convolutional neural network and attentive pooling according to some embodiments.

FIG. 9 is a flow diagram of process 900 to perform speaker verification according to some embodiments. Frame-level raw acoustic features are determined at S910 for each of a plurality of frames of speech signals of an unknown speaker. The frame-level raw acoustic features may be determined at S910 using any known signal processing designed to extract speaker-discriminative features from speech frames, and may comprise log-scaled filterbank features according to some embodiments. With reference to FIG. 8, magnitude spectrum unit 805 may generate frame-level magnitude spectra for each of the input speech frames according to some embodiments of S910.

Next, at S920, a plurality of long-range contextual features are generated based on the plurality of frame-level acoustic features. The plurality of long-range contextual features may be modeled by BLSTM 815, which may comprise lower layers of a BLSTM-ResNet network architecture which also includes projection layer 825 and CNN 840.

A plurality of two-dimensional feature maps are generated at S930 based on the plurality of long-range contextual features. According to some embodiments, projection layer 825 transforms the plurality of long-range contextual features into N feature maps which are the same size as a map of the frame-level acoustic features determined at S910. Such a transformation facilitates the input of the N+1 maps as multi-channel frame-level features which preserve the spectral contiguous patterns of the frames across the channels. A CNN generates frame-level speaker embeddings based on the N+1 input maps at S940.

The frame-level speaker embeddings are aggregated into an utterance-level speaker embedding at S950 based on respective attention weights assigned by a trained attention network. As will be described below, the attention network is trained such that those features which include more speaker-discriminative information are weighted more heavily in the aggregation than features which include less speaker-discriminative information. Accordingly, each frame-level speaker embedding will likely not contribute equally to the utterance-level speaker embedding.

S960 includes a determination of whether the unknown speaker is an enrolled speaker based on the utterance-level speaker embedding. S960 may utilize enrollment embeddings which were previously-generated by executing S910 through S950 based on speech frames of known speakers. The utterance-level speaker embedding of the unknown speaker is compared against each of the enrollment embeddings (e.g., by computing cosine distances) to determine a most-similar enrollment embedding. The speaker associated with the most-similar enrollment embedding is determined to be the unknown speaker. If none of the enrollment embeddings are deemed sufficiently similar to the unknown speaker embedding (e.g., the cosine distance is greater than a threshold), it may be determined that the unknown speaker is not one of the enrolled speakers.

Figure 10:
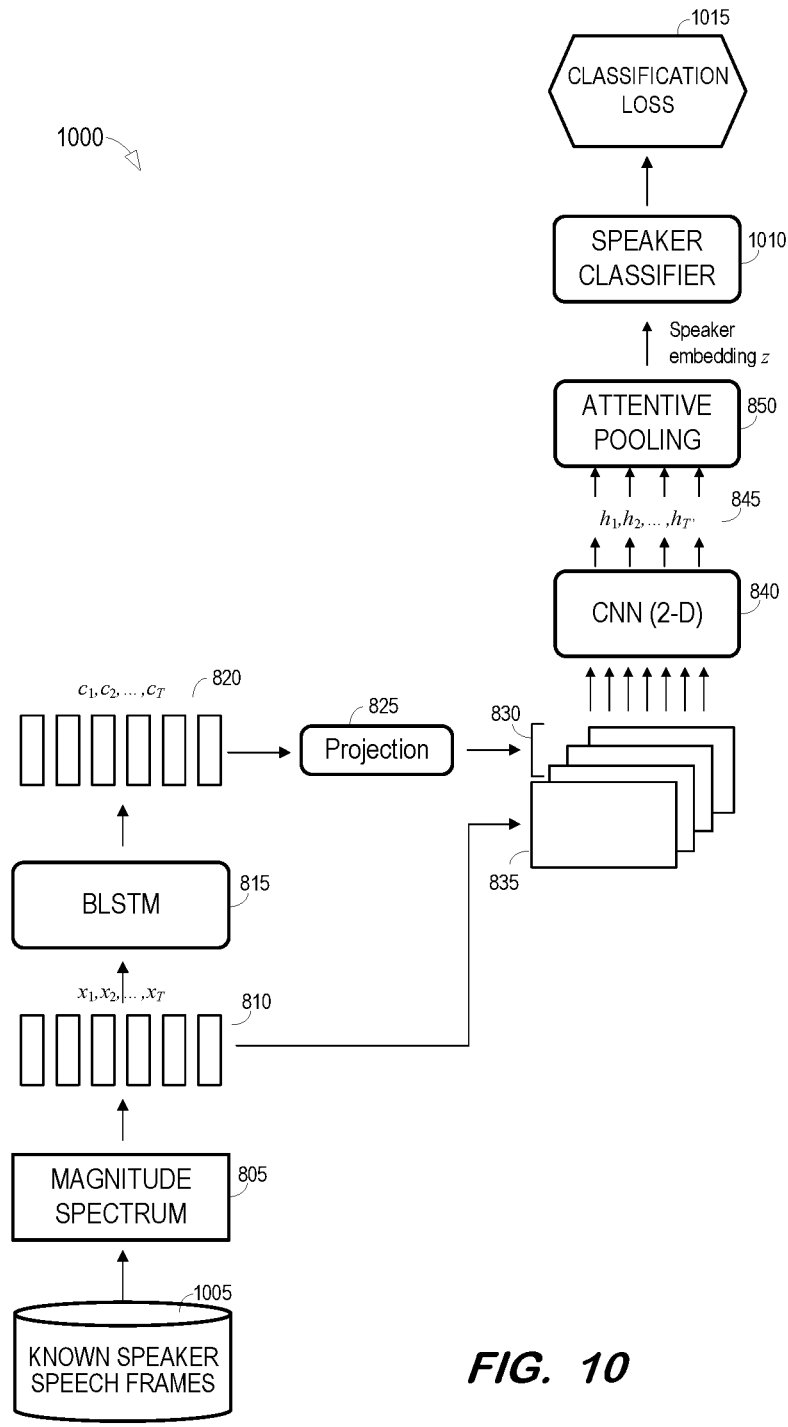
FIG. 10 is a block diagram illustrating end-to-end training of a system to verify a speaker's identity using long-range contextual features, a convolutional neural network and attentive pooling according to some embodiments.

FIG. 10 illustrates training architecture 1000 according to some embodiments. Training architecture 1000 may be used to jointly train BLSTM 815, projection layer 825, CNN 840, attentive pooling network 850 and speaker classifier 1010 to perform speaker classification. Speaker classifier 1010 may comprise any architecture to classify speakers based on an utterance-level speaker embedding that is or becomes known. Training architecture 1000 may be implemented using any suitable system to instantiate and train one or more artificial neural networks of any type. After such training, trained networks BLSTM 815, projection layer 825, CNN 840, attentive pooling network 850 may be deployed in a speaker verification network as shown in FIG. 8.

In contrast to architecture 600 in which networks DNN 125, CNN 140 and attentive pooling network 150 are trained after training of feature extractor 510, all the trained networks of the FIG. 8 network are trained jointly in an end-to-end manner. Also, unlike architecture 100 which requires training of an acoustic model in order to train feature extractor 110, training of the networks of architecture 800 does not require transcription (i.e., senone labelling) of a training set of speech frames.

Training architecture 1000 operates to input speech frames 1005 of known speaker data, evaluate the resulting output (e.g., speaker classification loss 1015) with respect to training objectives (e.g., minimize classification loss), modify parameters of BLSTM 815, projection layer 825, CNN 840, attentive pooling network 850 and speaker classifier 1010 accordingly, and repeat the process until the training objectives are sufficiently met. The training objective function may comprise the objective of $L_2$-constrained softmax as noted above, according to some embodiments.

Figure 11:
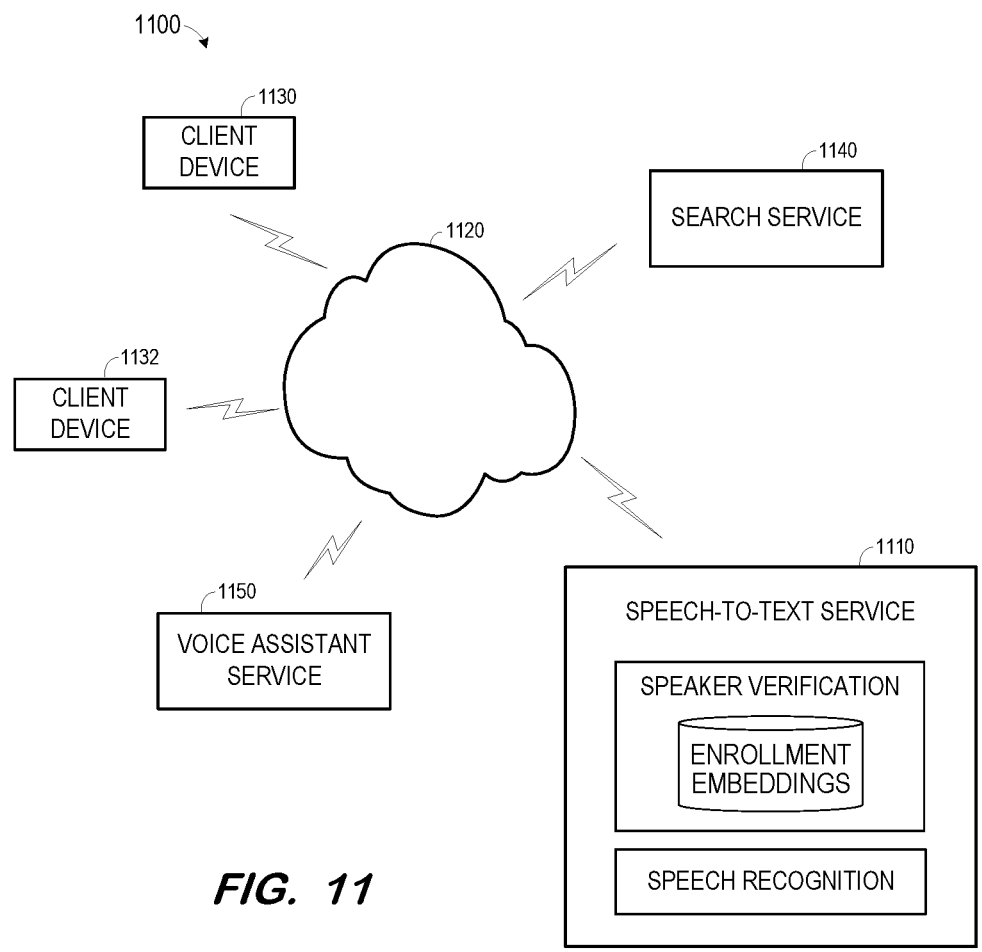
FIG. 11 is a block diagram of a cloud-based service to verify a speaker's identity using phonetic features, a convolutional neural network and attentive pooling according to some embodiments.

FIG. 11 illustrates distributed transcription system 1100 according to some embodiments. System 1100 may be cloud-based and components thereof may be implemented using on-demand virtual machines, virtual servers and cloud storage instances.

Speech-to-text service 1110 may be implemented as a cloud service providing transcription of speech audio signals received over cloud 1120. Speech-to-text service 1110 may include a speaker verification system trained as described above. The speaker verification system may provide speaker verification information (e.g., the received audio signal is associated with a particular enrolled speaker, or is not associated with any enrolled speaker). According to some embodiments, the speaker verification system may provide a speaker identity to a speech recognition system of speech-to-text service 1110 in order to facilitate speaker-specific speech recognition.

Each of client devices 1130 and 1132 may be operated to request services such as search service 1140 and voice assistant service 1150. Services 1140 and 1150 may, in turn, request speech-to-text functionality from speech-to-text service 1110.

Figure 12:
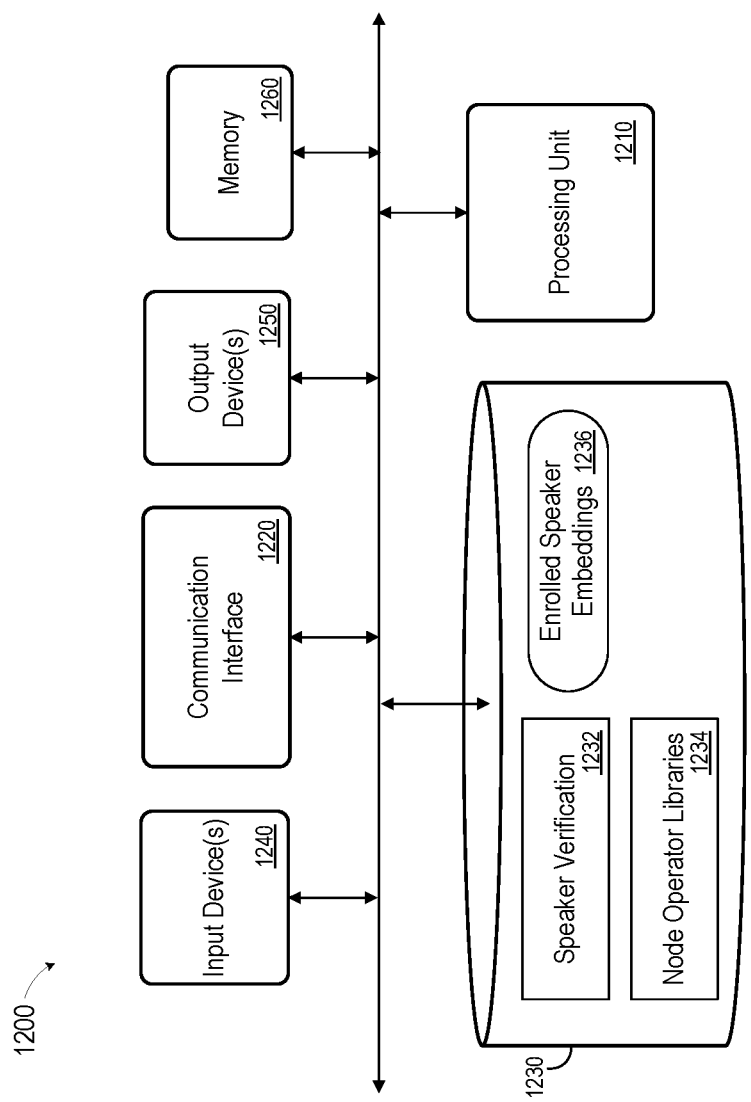
FIG. 12 is a block diagram of a system to verify a speaker's identity according to some embodiments.

FIG. 12 is a block diagram of system 1200 according to some embodiments. System 1200 may comprise a general-purpose server computer and may execute program code to provide a speaker verification service as described herein. System 1200 may be implemented by a cloud-based virtual server according to some embodiments.

System 1200 includes processing unit 1210 operatively coupled to communication device 1220, persistent data storage system 1230, one or more input devices 1240, one or more output devices 1250 and volatile memory 1260. Processing unit 1210 may comprise one or more processors, processing cores, etc. for executing program code. Communication interface 1220 may facilitate communication with external devices, such as client devices, and data providers as described herein. Input device(s) 1240 may comprise, for example, a keyboard, a keypad, a mouse or other pointing device, a microphone, a touch screen, and/or an eye-tracking device. Output device(s) 1250 may comprise, for example, a display (e.g., a display screen), a speaker, and/or a printer.

Data storage system 1230 may comprise any number of appropriate persistent storage devices, including combinations of magnetic storage devices (e.g., magnetic tape, hard disk drives and flash memory), optical storage devices, Read Only Memory (ROM) devices, etc. Memory 1260 may comprise Random Access Memory (RAM), Storage Class Memory (SCM) or any other fast-access memory.

Speaker verification network 1232 may comprise program code executed by processing unit 1210 to cause system 1200 to verify speaker identity using a system implemented as described herein. Node operator libraries 1234 may comprise program code to execute functions of a neural network nodes based on trained parameter values as described herein. Enrolled speaker embeddings 1236 may be generated based on enrollment speech frames using speaker verification network 1232 as described above. Enrolled speaker embeddings 1232 may be compared against a similarly-generated embedding of an unknown speaker to perform speaker verification as described. Data storage device 1230 may also store data and other program code for providing additional functionality and/or which are necessary for operation of system 1200, such as device drivers, operating system files, etc.

Each functional component and process described herein may be implemented at least in part in computer hardware, in program code and/or in one or more computing systems executing such program code as is known in the art. Such a computing system may include one or more processing units which execute processor-executable program code stored in a memory system.

Processor-executable program code embodying the described processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Embodiments are not limited to the examples described below.

The foregoing diagrams represent logical architectures for describing systems according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

The diagrams described herein do not imply a fixed order to the illustrated methods, and embodiments may be practiced in any order that is practicable. Moreover, any of the methods described herein may be performed by hardware, software, or any combination of these approaches. For example, a computer-readable storage medium may store thereon instructions which when executed by a machine result in performance of methods according to any of the embodiments described herein.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
   a processing unit; and
   a storage device including program code that when executed by the processing unit causes to the system to:
   determine a frame-level acoustic feature associated with each of a plurality of speech frames associated with a speaker;
   determine a frame-level phonetic feature associated with each of the plurality of speech frames based on the frame-level acoustic feature associated with each of the plurality of frame-level acoustic features;
   generate one or more two-dimensional feature maps based on the plurality of frame-level phonetic features;
   input the one or more two-dimensional feature maps to a trained neural network to generate a plurality of frame-level speaker embeddings, the trained neural network including a convolutional neural network;
   aggregate the plurality of frame-level speaker embeddings into a speaker embedding based on respective weights determined for each of the plurality of frame-level speaker embeddings; and
   determine an identity of the speaker based on the speaker embedding.

2. A system according to claim 1, wherein the respective weights determined for each of the plurality of frame-level speaker embeddings correspond to the speaker-discriminativity of the frame-level speaker embedding.

3. A system according to claim 1, wherein input of the one or more two-dimensional feature maps to the trained neural network comprises input of the plurality of frame-level acoustic features to the trained neural network.

4. A system according to claim 3, the program code when executed by the processing unit causes to the system to:
   determine a feature map based on the frame-level acoustic features,
   wherein input of the plurality of frame-level acoustic features to the trained neural network comprises input of the feature map based on the frame-level acoustic features.

5. A system of claim 4, wherein generation of the one or more two-dimensional feature maps based on the plurality of frame-level phonetic features comprises:
   input of the plurality of frame-level phonetic features to a trained deep neural network including a plurality of fully-connected layers, wherein the one or more two-dimensional feature maps and the feature map based on the frame-level acoustic features exhibit substantially similar contiguous spectral patterns.

6. A system according to claim 1, wherein determination of a frame-level phonetic feature associated with each of the plurality of speech frames comprises:
input of the plurality of frame-level acoustic features to a feature extraction network; and
output of the plurality of frame-level phonetic features from the feature extraction network.

7. A system according to claim 6, wherein the feature extraction network comprises a trained speech recognition network, and
wherein output of the plurality of frame-level phonetic features from the feature extraction network comprises extraction of the plurality of frame-level phonetic features from one or more hidden layers of the trained speech recognition network.

8. A non-transient, computer-readable medium storing program code to be executed by a processing unit to provide:
a bi-directional long short-term memory network to receive a plurality of multi-dimensional acoustic features and to determine a plurality of multi-dimensional long-range contextual features based on the plurality of multi-dimensional acoustic features;
a projection layer to generate one or more two-dimensional feature maps based on the plurality of multi-dimensional long-range contextual features;
a convolutional neural network to receive the one or more two-dimensional feature maps and to generate a plurality of speaker embeddings based on the one or more two-dimensional feature maps;
an attentive pooling network to determine respective weights for each of the plurality of speaker embeddings and to aggregate the plurality of speaker embeddings into a speaker embedding based on the respective weights; and
a speaker identifier to determine a speaker associated with the plurality of speech frames based on the speaker embedding.

9. A non-transient, computer-readable medium according to claim 8, wherein the respective weights determined for each of the plurality of embeddings correspond to the speaker-discriminativity of the speaker embedding.

10. A non-transient, computer-readable medium according to claim 8, wherein the convolutional neural network is to receive the one or more two-dimensional feature maps and the plurality of multi-dimensional acoustic features and is to generate a plurality of speaker embeddings based on the one or more two-dimensional feature maps and the plurality of multi-dimensional acoustic features.

11. A non-transient, computer-readable medium according to claim 10, the program code to be executed by the processing unit to:
determine a feature map based on the multi-dimensional acoustic features,
wherein receipt of the one or more two-dimensional feature maps and the plurality of multi-dimensional acoustic features comprises receipt of the one or more two-dimensional feature maps and the feature map based on the multi-dimensional features.

12. A non-transient, computer-readable medium of claim 11,
wherein the one or more two-dimensional feature maps and the feature map based on the multi-dimensional acoustic features exhibit substantially similar contiguous spectral patterns.

13. A non-transient, computer-readable medium according to claim 8, wherein the bi-directional long short-term memory network, the projection layer and the convolutional neural network comprise a bi-directional long short-term memory-ResNet network architecture.

14. A non-transient, computer-readable medium according to claim 8, wherein the bi-directional long short-term memory network, the projection layer, the convolutional neural network and the attentive pooling network are jointly trained.

15. A non-transient, computer-readable medium storing program code to be executed by a processing unit to provide:
a feature extractor to receive a plurality of multi-dimensional acoustic features and to determine a plurality of multi-dimensional phonetic features based on the plurality of multi-dimensional acoustic features;
a deep neural network to generate a plurality of two-dimensional feature maps based on the plurality of multi-dimensional phonetic features;
a convolutional neural network to receive the plurality of two-dimensional feature maps and the plurality of multi-dimensional acoustic features and to generate a plurality of speaker embeddings based on the plurality of two-dimensional feature maps and the plurality of multi-dimensional acoustic features;
an attentive pooling network to determine respective weights for each of the plurality of speaker embeddings and to aggregate the plurality of speaker embeddings into a first speaker embedding based on the respective weights; and
a speaker identifier to determine a speaker associated with the plurality of speech frames based on the speaker embedding.

16. A non-transient, computer-readable medium according to claim 15, wherein the respective weights determined for each of the plurality of embeddings correspond to the speaker-discriminativity of each of the plurality of embeddings.

17. A non-transient, computer-readable medium according to claim 15, the program code to be executed by the processing unit to:
determine a feature map based on the multi-dimensional acoustic features,
wherein inputting the plurality of two-dimensional feature maps and the plurality of multi-dimensional acoustic features to the convolutional neural network comprises inputting the plurality of two-dimensional feature maps and the feature map based on the multi-dimensional features.

18. A non-transient, computer-readable medium of claim 17, wherein the deep neural network comprises a plurality of fully-connected layers, and
wherein the plurality of two-dimensional feature maps and the feature map based on the multi-dimensional acoustic features exhibit substantially similar contiguous spectral patterns.

19. A non-transient, computer-readable medium according to claim 15, wherein the feature extraction network comprises a trained speech recognition network, and
wherein determination of the plurality multi-dimensional phonetic features comprises extraction of the plurality of multi-dimensional phonetic features from one or more hidden layers of the trained speech recognition network.

20. A non-transient, computer-readable medium according to claim 15, wherein the speaker identifier is further to compare the speaker embedding to each of a plurality set of speaker embeddings associated with respective speakers.

* * * * *